W. G. DUCKLOW.
SURVEYING APPARATUS.
APPLICATION FILED APR. 19, 1915.
1,195,342.
Patented Aug. 22, 1916.
2 SHEETS—SHEET 1.
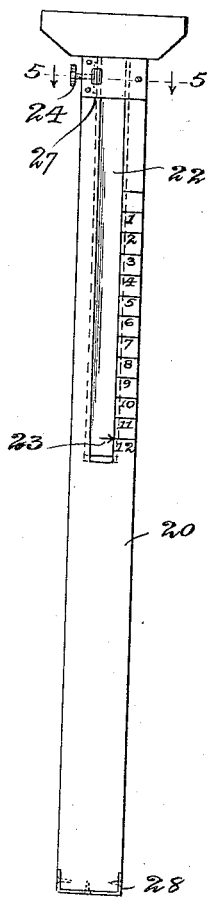
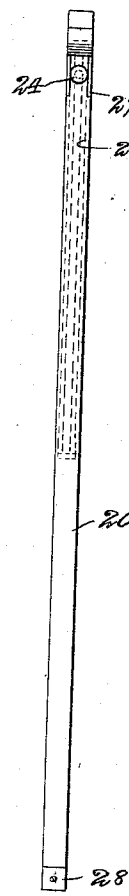
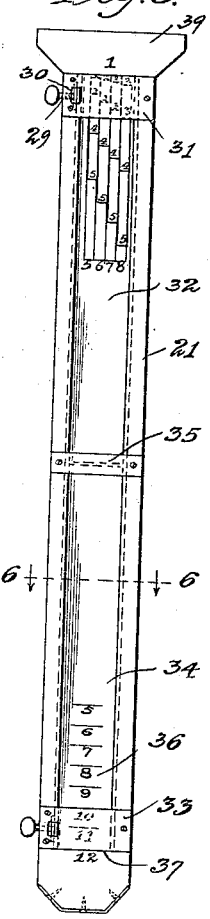
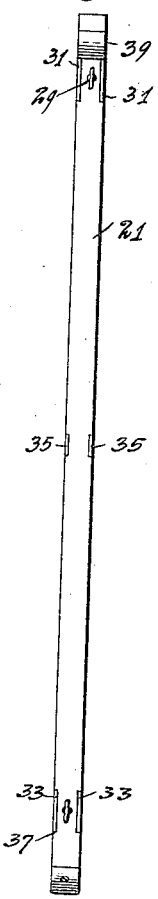
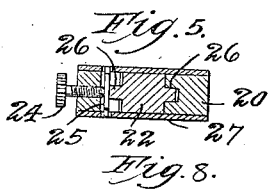
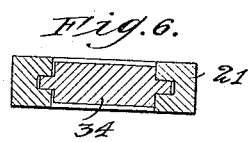
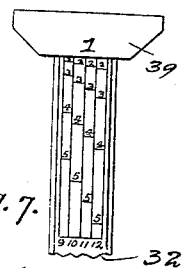
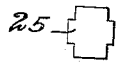
Witnesses,
S. S. Mann
C. A. Soans
Inventor,
Walter G. Ducklow
By Offield Towle Graves + Offield
Attys.

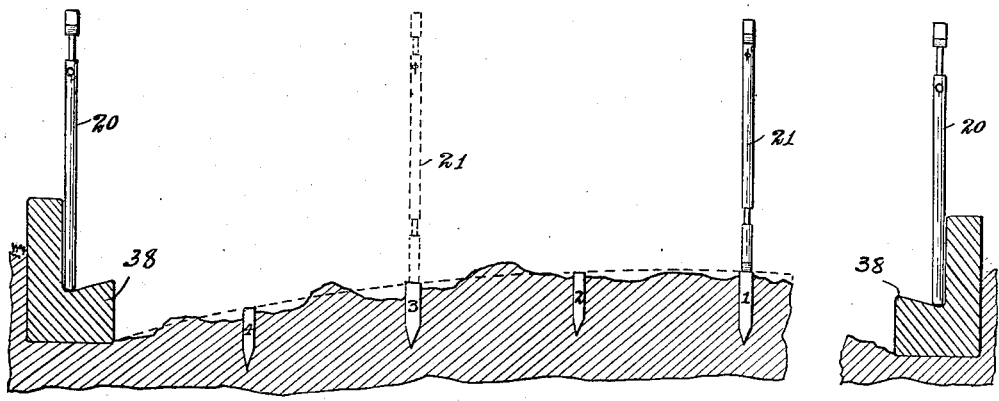
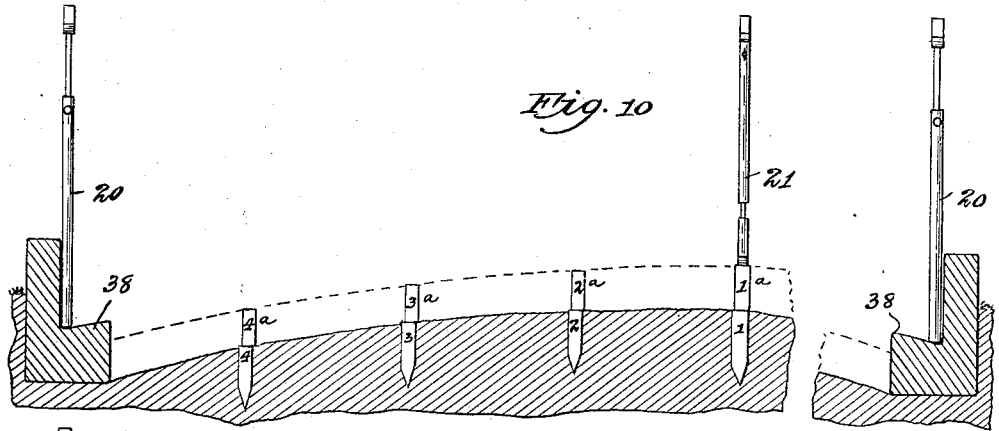
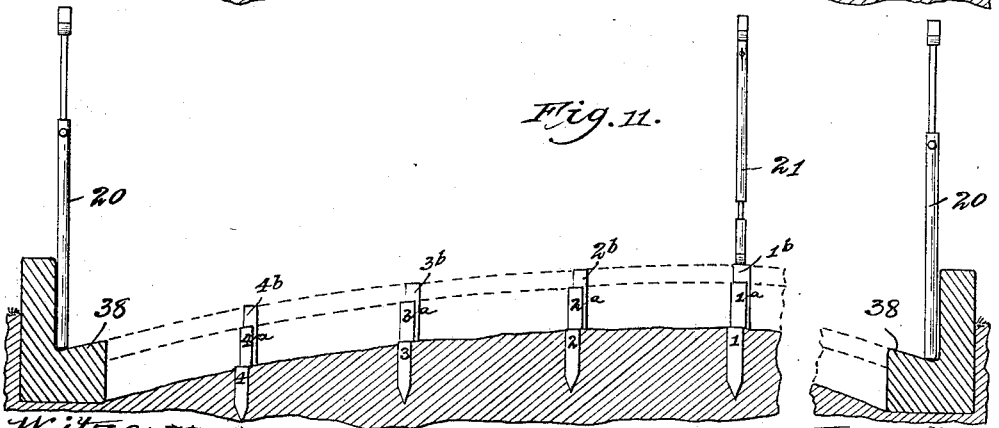

UNITED STATES PATENT OFFICE.

WALTER G. DUCKLOW, OF CHICAGO, ILLINOIS, ASSIGNOR OF ONE-HALF TO W. J. LANG AND W. B. BRADY, BOTH OF CHICAGO, ILLINOIS.

SURVEYING APPARATUS.

1,195,342.  Specification of Letters Patent.  Patented Aug. 22, 1916.

Application filed April 19, 1915.  Serial No. 22,340.

*To all whom it may concern:*

Be it known that I, WALTER G. DUCKLOW, a citizen of the United States, residing in the city of Chicago, county of Cook, and State of Illinois, have invented certain new and useful Improvements in Surveying Apparatus, of which the following is a specification.

My invention relates to improvements in surveying apparatus, and has particular reference to leveling means for laying out grade stakes, or other leveling stakes, in connection with road building.

Among the salient objects of the invention are, to provide a set of leveling staves for the purpose above referred to, which may be adjusted accurately and expeditiously for various different kinds or dimensions of work; to provide an improved set of leveling staves for the purpose described, which may be manipulated by persons unskilled in the use of ordinary surveying instruments; to provide a set of staves which enable the work to be set out with precision and speed, without the necessity of exercising undue care or special skill; to provide an improved construction of surveying apparatus of the class described, which shall be comparatively simple and economical to manufacture; and, in general, to provide an improved surveying apparatus for the purpose described.

The building of modern roadways, so far as selection of suitable materials and methods and processes for laying the same are concerned, has made great strides of recent years, but, so far as I am aware, no one has up to the present time, devised a convenient and simple apparatus for setting the stakes which mark the various cross-sectional grade lines; for instance, of the dirt grade, the top of the concrete forming the bed of the roadway and the surface of the finished pavement itself. Modern pavements are usually constructed with a crown surface for the purpose of shedding the rain and making the roadway, to a certain extent, self-cleaning. For ordinary widths of roadway, as for instance, from twenty to fifty feet, the rise, that is, the difference in level between the crown of the road and the gutter, varies from four to twelve inches. It should be understood, of course, that in order to secure proper drainage for the gutters, the latter are inclined slightly so as to slope both ways from a high point intermediate adjacent gutter drains. Since the crown of the road is always run straight, irrespective of the inclination of the gutters for draining purposes, a variation in the amount of rise or crown of the roadway occurs at various points along the same, the rise or crown being greatest at the cross-section located at the gutter drain or outlet, and considerably less than the maximum at the summit or cross-section located at the high point of the gutter intermediate two adjacent outlets along the length of the road. The desired amount of crown or rise at the various cross-sections along the road is determined by the engineer or surveyor.

Owing to the variation in the rise at the different cross-sections where stakes are to be set for the assistance of the workmen constructing the roadway, it is of particular importance that any apparatus devised for this purpose should be readily adjustable for various dimensions of crown; and since it is customary to build roads having various thicknesses of paving or surfacing material, it is very desirable that the apparatus should also be adjustable for the various thicknesses of the different materials forming the bed of the roadway. Owing to the comparatively high salaries of the ordinary surveying crew, with their usual surveyor's level and leveling staff, and also because of the degree of accuracy desired in setting the stakes, the ordinary painstaking and somewhat methodical methods employed by the regular surveying crew are not warranted; and it has been customary to confine the work of the regular surveying crew to the laying out of the gutter lines, leaving the foreman of the road-making gang to use any crude method which seemed proper to him to set the other stakes in the road. As a matter of fact, the foreman, although he sometimes uses a pair of staves and a crude form of scale for laying out possibly the center stake and one stake intermediate the center of the gutter, to a large extent depends on his eye to guide him in making the necessary crown effect. Naturally, such a practice frequently results in poor work, and, in addition, the foreman spends considerable time in laying out the roadway, which could be better employed in supervising the actual operations of the workmen.

My invention will be readily understood when described in connection with the accompanying drawings, in which—

Figure 1 is a side elevation of one of the side or fixed staves; Fig. 2 is an end elevation of Fig. 1; Fig. 3 is a side elevation of the center or movable staff; Fig. 4 is an end elevation of Fig. 3; Fig. 5 is a section taken on the line 5—5 of Fig. 1; Fig. 6 is a section taken on the line 6—6 of Fig. 3; Fig. 7 is a side elevation of the upper extension of the middle movable staff, shown in Fig. 3; Fig. 8 is a side view in elevation of one of the details of the clamps used for locking the staff extensions in the desired position; Fig. 9 is a cross-section showing the side curves completed and illustrating the use of my apparatus in setting the stakes for the dirt grade; Fig. 10 is a cross-section taken through the same roadway showing my apparatus used for the setting of stakes defining the grade of the top of the concrete; and Fig. 11 is a cross-section of the same roadway illustrating the use of my apparatus for setting the stakes for the surface of the pavement.

Referring to Figs. 9, 10 and 11, it will be observed that in setting the stakes I employ three staves: two side staves 20, which are identical, and usually placed in the gutter at the side of the road, and a middle stake 21 which is used to determine the heights of the tops of the stakes set in the cross-section of the roadway between the side staves. This is effected in an obvious manner by sighting across the two outer staves and sinking the stake to be set into the surface of the ground until the top of the middle staff 21 is level with the tops of the two outer side staves 20. My invention consists in the manner in which the outer staves 20 and the middle staff 21 are provided with adjustable extensions which are properly graduated for the various purposes.

As seen in Figs. 1, 2 and 5, each of the side staves 20 is a wooden staff, rectangular in section, within the top of which slides an extension 22. Upon the lower end of this extension 22 is marked an index line 23. In the position shown in Fig. 1, where the staff 22 is at its shortest, this index line points to the lowest graduation of a scale of inches inscribed upon the side of the staff. This scale of inches is furnished for the purpose of setting the staves 20 for any thickness of paving for which stakes are to be set. In order to adjust the extension 22 to the proper thickness of paving, I provide a clamping screw 24 which is adapted to force a small clamping plate 25 against the side of the lower sliding part of the extension 22. This clamping plate is supported in slots punched in the sides of the metal straps 27, which prevent spreading of the open ends of the slot in which slides the extension 22.

It should be understood that the lower part of the extension 22 has on each side a tongue 26 which slides freely within a corresponding groove in the body of the staff 20. The bottom of the staff is shod with a metal plate 28 which protects the wood against excessive wear.

The middle staff 21, which, as previously described, is the staff which is set upon the stake being driven to determine whether the proper level has been reached, has a sliding extension at either of its ends, each of said extensions having tongue and groove engagement with the central portion of the staff which has at each of its ends a clamping screw 29 similar to the clamping screw 24, together with a similar clamping plate 30. The top of the central portion of the staff 21 is connected across as to its open ends by means of a pair of plates 31, between which the upper extension 32 slides, and the lower end of the staff 21 is fitted with similar side plates 33 bridging the lower open ends of the central portion of the staff 21 and inclosing the lower extension 34. The middle portion of the staff at center is held together against separation by plates 35 which, as shown, cover the adjacent abutting ends of the two extensions 32 and 34 when the staff is at its shortest. Upon one side of the lower extension 34 of the staff 21 there is inscribed a graduated scale of inches 36, the highest number of the scale being at its lowest point and coincident with the lower edge 37 of one of the straps 33. This scale, which in this instance is shown extending from 5 to 12, is for the purpose of adjusting the central staff for various heights of rise or crown. The upper extension 33 is graduated with a series of scales, the graduations of each of which are numbered 2, 3, 4 and 5, the individual scales at their lower ends being numbered 5, 6, 7 and 8. It should be understood that on the other side of the extension 32 there is a similar set of scales the graduations of which are similarly numbered 2, 3, 4 and 5, the separate scales being numbered 9, 10, 11 and 12. These scales just described are for the purpose of setting the stakes intermediate the center stake at the crown of the road and the intermediate stakes 2, 3, and 4 on each side of the center stake No. 1. Although I have shown graduation marks numbered 5, it is manifest that No. 5 stake in this instance is the stake at the gutter line, and hence No. 5 graduation is not often set in practice, since the height of the dirt grade and the surface of the pavement is already shown by the combination cement gutter 38. The position of the No. 1 graduation for each of the scales 5, 6, 7, 8, 9, 10, 11 and 12 is formed by the lower edge of the cross-piece 39 which coincides with the top edge of the plate 31 when the extension 32 is in its inmost position. It is of course apparent that when the extension 32 is in such position, as shown in Fig. 3, the extension 32 is in the proper relation for setting the crown or middle stake in the cross-section of the roadway.

As a matter of convenience, I have illustrated the two datum staves, and the middle movable or stake-setting staff, all of the same minimum length so that the three staves may be used unextended whenever it is desired to set stakes which are all level or which have a uniform slope; such, for instance, as the stakes along the crown of the road intermediate the cross-sections at the summit and the outlet and the intermediate stakes numbered 2, 3, and 4 at cross-sections intermediate the cross-sections at the summit and outlet cross-sections.

It is almost a universal practice to lay out the cross-section of an ordinary road pavement as the arc of a circle, the radius of which establishes the rise or crown of the finished road surface. Hence, the difference in level between the adjacent intermediate stakes between the crown and the gutter is not the same, and it is necessary to calculate or otherwise establish the differences in level for each of these intermediate points for every size of crown or amount of rise which is to be dealt with. For convenience, I have shown three stakes, numbered 2, 3 and 4, between the central or crown stake No. 1 and the gutter, which is ample for all ordinary widths of roadway; but it should be understood that the apparatus could be graduated for a different number of intermediate stakes, if thought desirable. I have shown the side staves graduated in inches from 0 to 12 so as to make said staves adjustable for all thicknesses of material up to twelve inches, and I have illustrated a central stake-setting staff graduated for crowns of from 5 to 12 inches of rise.

Describing the manner of use of the apparatus, and referring to Figs. 9, 10 and 11, it will be seen that I have selected as an illustration of the application of my invention a street or road in course of construction and having the combination gutter and curb completed, with dirt grade roughed out in readiness to be smoothed off for the concrete foundation over which is to be laid a wearing surface of asphalt. Assuming that the asphalt is to be two inches in thickness and the concrete bed six inches in thickness, each of the side staves 20 will be extended and clamped with the index set at 8 inches, which is the difference in height between the surface of the finished road and the surface of the dirt grade. Assuming also that this particular cross-section is to have a crown of 10-inch rise, the lower extension 34 of the central stake-setting staff is pulled out a distance of two inches so that the 10-inch graduation coincides with the lower edge 37 of the strap 33. The lower extension 34 is then clamped at this setting, which remains fixed while all of the stakes are being set in that particular cross-section. The dirt grade stakes, the positions of which have been previously determined by measuring with a tape line or other measuring instrument, are driven into the ground a short distance in their proper locations. The two side staves 20 with their 8-inch adjustment, are then set vertically in the corners of the gutters, as shown in Fig. 4, and a sight is taken across the tops of the same while the central staff is set upon stake No. 1, the upper extension 32 having been set at No. 1. No. 1 stake is then driven down until the top of the staff 21 coincides with the line of sight across the two side staves 20. The upper extension 32 is then pulled out slightly until the top of the strap 31 coincides with No. 2 graduation on the 10 scale. The No. 2 stakes on each side of the center line of the road are then driven in until the top of the staff 21 registers with the line of sight. The remaining stakes, 3 and 4, for the dirt grade, are set in a similar manner, the upper extension of the staff 21 being still further extended to 3 and 4 upon the scale 10.

Having completed the setting of all of the dirt grade stakes, as shown in Fig. 9, the side staves 20 are then re-set and fixed with the index at 2 inches, which is the thickness of asphalt to be laid. No change, however, is made in the setting of the lower extension 34 of the central staff 21. The concrete stakes $1^a$, $2^a$, $3^a$ and $4^a$ are then set in position adjacent to the dirt grade stakes 1, 2, 3 and 4, using the middle staff 21 in the same manner as when setting the dirt grade stakes 1, 2, 3 and 4; the result of extending the side staves from the 8-inch mark to the 2-inch mark being to establish the profile line of the stakes $1^a$, $2^a$, $3^a$ and $4^a$ six inches above the profile line of the dirt grade stakes. After having set the dirt grade stakes and the concrete stakes, the side staves 20 are then further extended and set with the indices at zero preparatory to driving the road-surface stakes, which are then set in similar manner, as shown at $1^b$, $2^b$, $3^b$ and $4^b$ in Fig. 11.

After having in the above manner set all of the stakes for a particular cross-section which, in practice, is either at a summit or an outlet point in the length of the roadway, the apparatus is removed to the nearest adjacent outlet or summit point and there used in the same manner for setting the stakes at that point. It should be understood that the manipulation of the staves is exactly the same as has been described, with the exception that, if the crown is of a different height, owing to the difference in height of rise between the summit and outlet cross-sections, the lower extension of the staff 21 will have its adjustment changed accordingly. After all of the stakes have been set in the adjacent summit and outlet cross-sections, it is necessary to set the stakes intermediate the outlet and summit. However, it is not necessary to utilize the adjustable features of the apparatus for this purpose, since all that is required is to push the extensions of all of the staves into their inmost positions, thus bringing them all to the same length, after which the stakes at the intermediate cross-sections can be readily set by holding the two side staves 20 upon correspondingly numbered stakes at summit and outlet cross-sections, setting the staff 21 upon the corresponding stake of the intermediate cross-section and sighting across the three stakes until the intermediate stake has been driven deep enough to bring the top of the intermediate staff 21 coincident with the line of sight.

It is important to note that the central staff 21, when laying out the initial cross-section stakes, is always clamped with its lower extension set at the required crown or height of rise, which setting of the lower extension 34 remains fixed while all of the stakes—dirt grade, concrete, and surface—are being set at that particular cross-section. It is also clear that the upper extension 32 is always set at the number of graduation and of the proper crown scale which corresponds to the number of stake which is being set and with the height of crown to which the lower extension 34 has previously been set. The setting of the side staves 20 remains constant while all of the dirt grade stakes are being set. It is then changed, after which all of the concrete stakes are set, and it is always set finally at zero, while all of the road-surface stakes are being driven.

It should be apparent to those persons occupied in road construction that my apparatus presents many advantages over the other known methods of laying out work of the class described, in its ease of manipulation, the lack of skill or training required in its use, and in the increased accuracy of the work.

Although I have described what I consider to be a preferred embodiment of my invention, it should be understood that many of its details may be varied widely without departing from the spirit of the invention; hence, I do not wish to be limited to the use of the details shown, except as specified in the appended claims.

I claim—

1. A leveling staff for setting grade stakes at points of different level on the desired predetermined cross section of a roadbed or analogous work, said staff being of suitable length to be used with an established sighting line and having an adjustable extension provided with a series of vertical scales, each of said scales calculated for a previously determined profile and having graduations thereon according to the differences in the desired levels of the separate stakes in a particular cross section and indicating the amount of extension.

2. A leveling staff for setting stakes at points of different level on a plurality of different predetermined cross sectional profiles of a roadbed or analogous work, said staff to be used in connection with means for establishing a horizontal sighting line and provided with an extension adjustable for and indicating different heights of crown or rise of the center of the road whereby the staff may be set for a given height of crown or rise, and a second adjustable extension having a series of scales, each for a roadway having a specific amount of crown or rise and each scale having a set of graduations, the spacing thereof corresponding with the differences of level between adjacent stakes of the cross section for said crown or rise.

WALTER G. DUCKLOW.

Witnesses:
C. A. Soans,
Mary M. Leppo.

Copies of this patent may be obtained for five cents each, by addressing the "Commissioner of Patents. Washington, D. C."